(12) United States Patent
Inoue et al.

(10) Patent No.: US 8,773,700 B2
(45) Date of Patent: Jul. 8, 2014

(54) PANORAMIC IMAGE PREPARING METHOD AND THREE-DIMENSIONAL LASER SCANNER

(75) Inventors: Takahiro Inoue, Tokyo-to (JP); Ken-ichiro Yoshino, Tokyo-to (JP)

(73) Assignee: Kabushiki Kaisha TOPCON, Tokyo-to (JP)

(*) Notice: Subject to any disclaimer, the term of this patent is extended or adjusted under 35 U.S.C. 154(b) by 121 days.

(21) Appl. No.: 13/408,260

(22) Filed: Feb. 29, 2012

(65) Prior Publication Data

US 2012/0229870 A1 Sep. 13, 2012

(30) Foreign Application Priority Data

Mar. 7, 2011 (JP) ................................. 2011-048745

(51) Int. Cl.
*H04N 1/40* (2006.01)
*G06F 15/00* (2006.01)
*H04N 1/407* (2006.01)
*H04N 1/387* (2006.01)

(52) U.S. Cl.
USPC ........................ 358/1.15; 358/1.14; 358/1.16

(58) Field of Classification Search
None
See application file for complete search history.

(56) References Cited

U.S. PATENT DOCUMENTS

| | | | |
|---|---|---|---|
| 5,898,490 A | 4/1999 | Ohtomo et al. | |
| 6,246,468 B1 | 6/2001 | Dimsdale | |
| 6,292,263 B1 | 9/2001 | Norita et al. | |
| 6,330,345 B1 * | 12/2001 | Russo et al. | 382/115 |
| 6,330,523 B1 | 12/2001 | Kacyra et al. | |
| 6,473,166 B1 | 10/2002 | Ohishi et al. | |
| 6,825,796 B2 | 11/2004 | Oki | |
| 6,859,269 B2 | 2/2005 | Ohtomo et al. | |
| 7,092,075 B2 | 8/2006 | Singh et al. | |
| 7,196,302 B2 | 3/2007 | Ohtomo et al. | |
| 7,319,511 B2 | 1/2008 | Murai et al. | |
| 7,345,748 B2 | 3/2008 | Sugiura et al. | |
| 7,552,025 B2 | 6/2009 | Ohtomo et al. | |
| 7,626,690 B2 | 12/2009 | Kumagai et al. | |
| 7,676,022 B2 * | 3/2010 | Pantsar et al. | 378/39 |

(Continued)

FOREIGN PATENT DOCUMENTS

| | | | |
|---|---|---|---|
| EP | 1061335 A2 | 12/2000 | |
| EP | 1176393 A2 | 1/2002 | |

(Continued)

OTHER PUBLICATIONS

Topcon Corporation Catalogue, 2010, "GLS—1500: Compact, Operator-friendly Laser Scanner", 4 pages.

(Continued)

*Primary Examiner* — Mark Zimmerman
*Assistant Examiner* — Darryl V Dottin
(74) *Attorney, Agent, or Firm* — Nields, Lemack & Farme, LLC

(57) ABSTRACT

A panoramic image preparing method comprises a step of setting a measurement range 70 so as to include objects to be measured 72, 73, and 74, a step of dividing the measurement range as required and setting two or more sections 71 and a step of synthesizing partial images 81 photographed for each of the sections and preparing a panoramic image 80, a step of photographing each of the sections under two or more image pickup conditions and a step of synthesizing the panoramic image by using the partial image photographed under an optimal image pickup condition at least about the object to be measured.

8 Claims, 7 Drawing Sheets

(56) References Cited

U.S. PATENT DOCUMENTS

| | | |
|---|---|---|
| 7,689,032 B2 | 3/2010 | Strassenburg-Kleciak |
| 7,726,033 B2 | 6/2010 | Ohtomo et al. |
| 7,804,498 B1 | 9/2010 | Graham et al. |
| 8,045,762 B2 | 10/2011 | Otani et al. |
| 2002/0059042 A1 | 5/2002 | Kacyra et al. |
| 2002/0167589 A1* | 11/2002 | Schofield et al. ............ 348/148 |
| 2004/0125357 A1 | 7/2004 | Ohtomo et al. |
| 2005/0195384 A1 | 9/2005 | Ohtomo et al. |
| 2005/0213808 A1 | 9/2005 | Ohtomo et al. |
| 2006/0017938 A1 | 1/2006 | Ohtomo et al. |
| 2006/0188143 A1 | 8/2006 | Strassenburg-Kleciak |
| 2007/0107240 A1 | 5/2007 | Piekutowski |
| 2008/0074637 A1 | 3/2008 | Kumagai et al. |
| 2008/0075326 A1 | 3/2008 | Otani et al. |
| 2009/0235543 A1 | 9/2009 | Hayashi et al. |
| 2009/0241358 A1* | 10/2009 | Ohtomo et al. ............ 33/275 R |
| 2010/0134596 A1 | 6/2010 | Becker |
| 2010/0259772 A1* | 10/2010 | Ebihara et al. ............ 358/1.9 |

FOREIGN PATENT DOCUMENTS

| | | |
|---|---|---|
| EP | 1347267 A1 | 9/2003 |
| EP | 1411371 A1 | 4/2004 |
| EP | 1544800 A2 | 6/2005 |
| EP | 1662228 A1 | 5/2006 |
| EP | 1903303 A2 | 3/2008 |
| JP | 10-19562 A | 1/1998 |
| JP | 2000-509510 A | 7/2000 |
| JP | 2002-202126 A | 7/2002 |
| JP | 2003-279351 A | 10/2003 |
| JP | 2004-163292 A | 6/2004 |
| JP | 2004-333211 A | 11/2004 |
| JP | 2005-249715 A | 9/2005 |
| JP | 2005-283221 A | 10/2005 |
| JP | 2008-82707 A | 4/2008 |
| JP | 2008-82782 A | 4/2008 |
| JP | 2008-268004 A | 11/2008 |
| JP | 2009-204449 A | 9/2009 |
| WO | 97/40342 A2 | 10/1997 |
| WO | 01/31290 A2 | 5/2001 |
| WO | 2010/108642 A1 | 9/2010 |

OTHER PUBLICATIONS

European Communication, dated May 25, 2012 and transmitting the Extended European Search Report, in corresponding European Patent Application No. EP 12157969.2.

* cited by examiner

US 8,773,700 B2

PANORAMIC IMAGE PREPARING METHOD AND THREE-DIMENSIONAL LASER SCANNER

BACKGROUND OF THE INVENTION

The present invention relates to a panoramic image preparing method and a three-dimensional laser scanner.

A three-dimensional laser scanner has been known as a surveying device for acquiring three-dimensional data (3D data) of an object to be measured in a short time.

The three-dimensional laser scanner is installed at a reference point, scans a measurement range or an object to be measured with a pulse laser beam, measures a distance for each pulse laser beam and acquires point-group data. In a case where the point-group data is to be acquired in a wide range, the three-dimensional laser scanner is installed at other reference points, the three-dimensional laser scanner acquires the point-group data for an adjacent measurement range and synthesizes the acquired point-group data so as to make the acquirement of the point-group data in a wide range possible.

Further, there is a three-dimensional laser scanner which comprises an image pickup device, acquires an image of the measurement range by the image pickup device, acquires color information (RGB) of a measuring point from the acquired image, attaches the color information to three-dimensional coordinate of the measuring point and applies the coloring to the image of the object to be measured drawn by the point-group data so that the image can be easily recognized.

In a case where the measurement range of the three-dimensional laser scanner is widened, the measurement range becomes larger than a photographing range of a single image pickup device and thus, the image corresponding to the measurement range becomes a panoramic image acquired by synthesizing partially acquired images. FIG. 8 illustrates an example of a relationship between a panoramic image 83 and a photographing range 84 of the single image pickup device and one section illustrated in FIG. 8 indicates the photographing range 84 of the single image pickup device and the illustrated panoramic image 83 is composed of vertically 5 by laterally 5 photographing ranges 84.

Conventionally, in a case where a panoramic image is to be acquired, contrast is adjusted at a center of the panoramic image. The contrast is set so that the contrast becomes optimal at a center the photographing range 84, and the photographing of the entire measurement range is performed with the set contrast. However, brightness is usually different depending on a direction of photographing and a photographing position, and if the contrast is adjusted at the center photographing range 84, the contrast no longer becomes optimal in a part, which is too bright, and in a part which is too dark as exemplified in FIG. 9.

Therefore, the color information of image data acquired by photographing with the contrast, which is not optimal, is attached with respect to the measuring point of the part, which is too bright or too dark. Thus, the colored image prepared by the acquired point-group data also reflects the contrast state of the image data.

SUMMARY OF THE INVENTION

It is an object of the present invention to provide a panoramic image preparing method for optimizing contrast in a panoramic image corresponding to a measurement range and a three-dimensional laser scanner for acquiring image data so that the contrast in the panoramic image becomes optimal.

To attain the above object, a panoramic image preparing method according to the present invention comprises a step of setting a measurement range so as to include objects to be measured, a step of dividing the measurement range as required and setting two or more sections and a step of synthesizing partial images photographed for each of the sections and preparing a panoramic image, a step of photographing each of the sections under two or more image pickup conditions and a step of synthesizing the panoramic image by using the partial image photographed under an optimal image pickup condition at least about the object to be measured.

Further, in the panoramic image preparing method according to the present invention, at least about the section including the object to be measured, the panoramic image is synthesized by using an image photographed under the optimal image pickup condition out of the acquired images.

Further, the panoramic image preparing method according to the present invention further comprises a step of preparing a panoramic image by partial images acquired under the same image pickup condition, a step of selecting the panoramic image having the optimal image pickup condition about the object to be measured out of the two or more panoramic images with the two or more image pickup conditions, a step of cutting a region including the object to be measured out of the selected panoramic image, and a step of synthesizing the panoramic image by using the cut-out image.

Further, in the panoramic image preparing method according to the present invention, the image pickup condition is set for each of the sections in accordance with a photographing direction in a case where a light amount is different depending on the photographing direction.

Further, in the panoramic image preparing method according to the present invention, the image pickup condition is the contrast.

Further, a three-dimensional laser scanner according to the present invention comprises a light source for emitting a distance measuring light as pulsed light, a projection optical system for projecting the distance measuring light from the light source to a measurement range, a photodetection unit for receiving a reflected distance measuring light, a scanning unit for scanning the measurement range with the distance measuring light, an angle detection unit for detecting a projecting direction of the distance measuring light, a distance measuring unit for calculating a distance to an object to be measured located in the measurement range based on photodetection signals from the photodetection unit, an image pickup unit for acquiring an image of the measurement range, and a control unit for controlling the light source, the photodetection unit, the scanning unit, the distance measuring unit, and the image pickup unit, and in the three-dimensional laser scanner, the control unit calculates three-dimensional data based on an angle detection signal from the angle detection unit and based on a distance measurement result from the distance measuring unit, sets the measurement range so as to include the object to be measured, divides the measurement range into at least two or more sections, photographs each section and acquires a partial image, synthesizes the partial images and prepares a panoramic image of the measurement range, and at least about the partial image of the section including the object to be measured but of the partial images to be synthesized is photographed under the optimal image pickup condition.

Further, in the three-dimensional laser scanner according to the present invention, the control unit acquires the partial image by photographing each of the section under at least two image pickup conditions, synthesizes the partial images photographed under one image pickup condition and prepares a reference panoramic image, selects an image with the optimal image pickup condition out of at least two image pickup conditions about the image of the object to be measured and attaches the image to the reference panoramic image.

Further, in the three-dimensional laser scanner according to the present invention, the control unit sets a cut-out region of the image based on the three-dimensional data, selects the image having the cut-out region with the optimal image pickup condition out of the images photographed under at least two image pickup conditions, cuts out the cut-out region from the image and attaches the cut-out region to the reference panoramic image.

Further, in the three-dimensional laser scanner according to the present invention, the partial image in which the object to be measured has the optimal image pickup condition is selected and the image is attached to the reference panoramic image.

Further, in the three-dimensional laser scanner according to the present invention, the image pickup condition is the contrast.

According to the present invention, the panoramic image preparing method comprises a step of setting a measurement range so as to include objects to be measured, a step of dividing the measurement range as required and setting two or more sections and a step of synthesizing partial images photographed for each of the sections and preparing a panoramic image, a step of photographing each of the sections under two or more image pickup conditions and a step of synthesizing the panoramic image by using the partial image photographed under an optimal image pickup condition at least about the object to be measured. As a result, a high quality image can be acquired about the object to be measured at any position of the panoramic image.

Furthermore, according to the present invention, the three-dimensional laser scanner comprises a light source for emitting a distance measuring light as pulsed light, a projection optical system for projecting the distance measuring light from the light source to a measurement range, a photodetection unit for receiving a reflected distance measuring light, a scanning unit for scanning the measurement range with the distance measuring light, an angle detection unit for detecting a projecting direction of the distance measuring light, a distance measuring unit for calculating a distance to an object to be measured located in the measurement range based on photodetection signals from the photodetection unit, an image pickup unit for acquiring an image of the measurement range, and a control unit for controlling the light source, the photodetection unit, the scanning unit, the distance measuring unit, and the image pickup unit, and in the three-dimensional laser scanner, the control unit calculates three-dimensional data based on an angle detection signal from the angle detection unit and based on a distance measurement result from the distance measuring unit, sets the measurement range so as to include the object to be measured, divides the measurement range into at least two or more sections, photographs each section and acquires a partial image, synthesizes the partial images and prepares a panoramic image of the measurement range, and at least about the partial image of the section including the object to be measured out of the partial images to be synthesized is photographed under the optimal image pickup condition. As a result, a high quality image can be acquired about the object to be measured at any position in the panoramic image.

BRIEF DESCRIPTION OF THE DRAWINGS

FIG. 4A shows a bright panoramic image, FIG. 4B shows a dark panoramic image, and FIG. 4C shows a panoramic image in which the partial image with the optimal contrast is incorporated;

DETAILED DESCRIPTION OF THE PREFERRED EMBODIMENTS

Description will be given below on an embodiment of the present invention by referring to the attached drawings.

Figure 1:
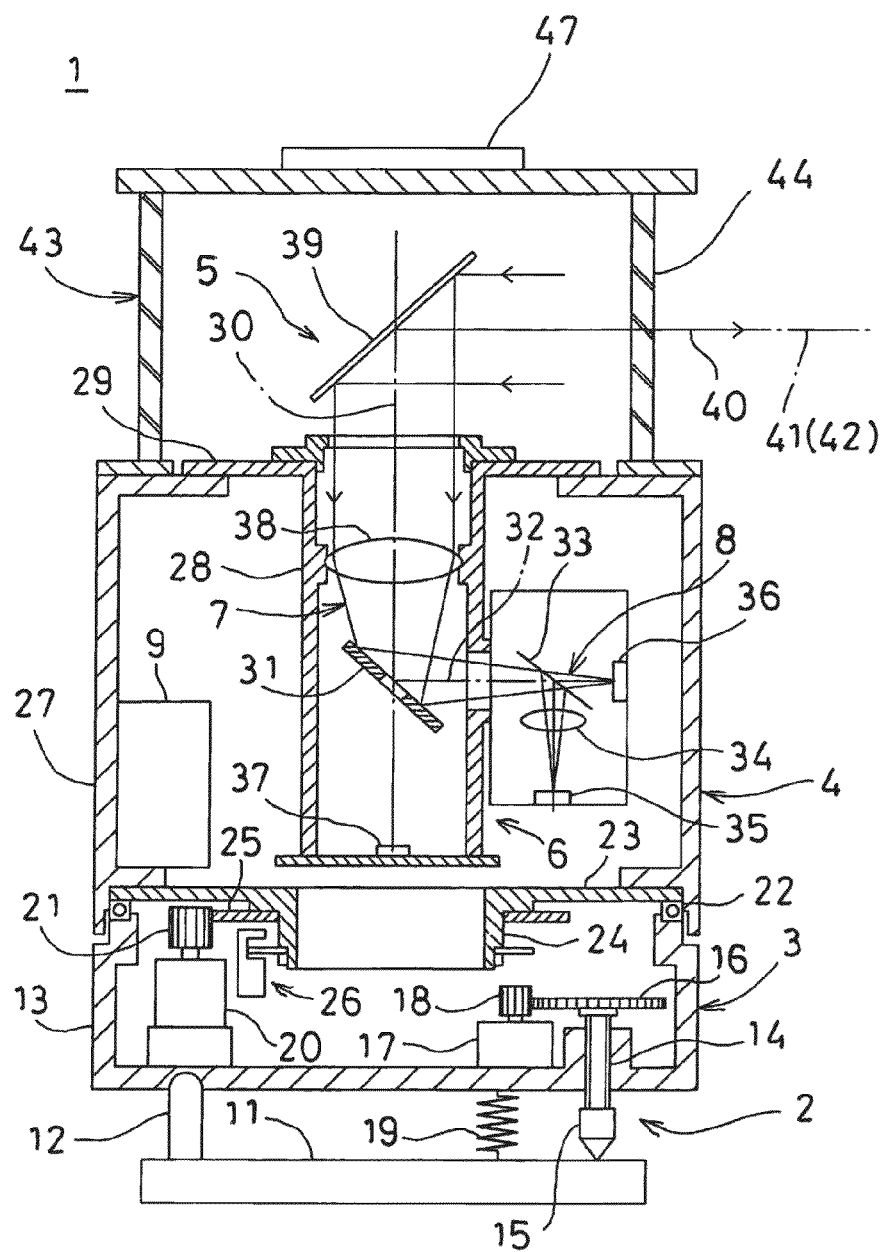
FIG. 1 is a cross-sectional view of a laser scanner according to an embodiment of the present invention.
Figure 2:
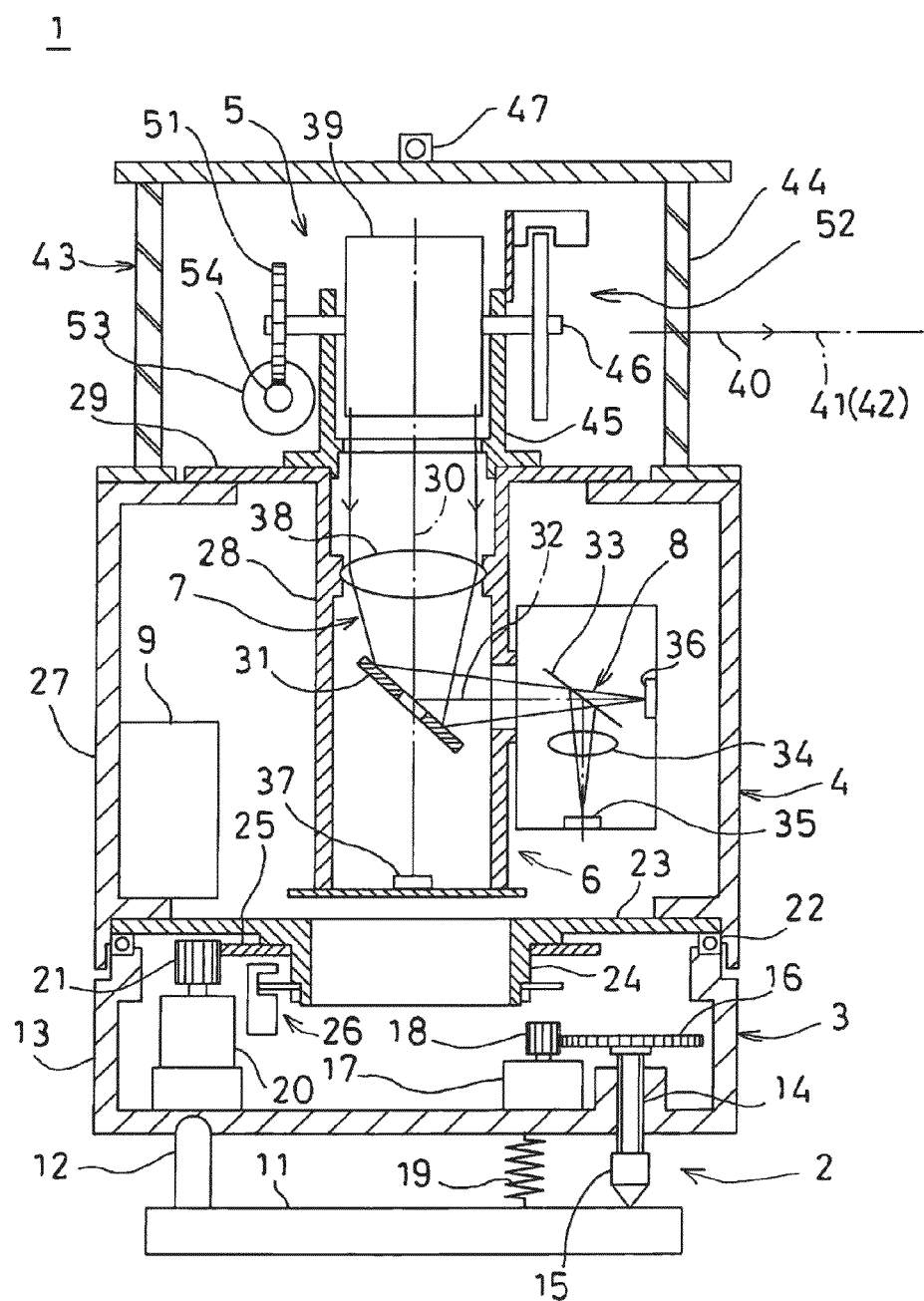
FIG. 2 is a cross-sectional view of the laser scanner when a part of thereof is rotated.

First, referring to FIG. 1 to FIG. 3, description will be given on a three-dimensional laser scanner according to the embodiment of the present invention.

A laser scanner 1 primarily comprises a leveling unit 2, a rotary mechanism 3 installed on the leveling unit 2, a measuring system main unit 4 rotatably supported on the rotary mechanism 3, and a scanning unit 5 mounted on an upper part of the measuring system main unit 4. Moreover, in the measuring system main unit 4, a distance measuring unit 6, a projection optical system 7, a photodetection optical system 8, a control unit 9 etc. are accommodated. For convenience purpose, FIG. 2 shows a condition where only the scanning unit 5 is seen from a lateral direction with respect to FIG. 1.

Description will be given on the leveling unit 2.

A pin 12 is installed upright on a base unit 11, an upper end portion of the pin 12 is formed into a curved surface, and the upper end portion of the pin 12 is freely tiltably engaged with a concave portion formed on a bottom surface of a lower casing 13. At other two points on the bottom surface, adjusting screws 14 are screwed in and are penetrating through. On a lower end portion of the adjusting screw 14, a leg member 15 is fixedly attached. A lower end of the leg member 15 is formed into a tapered end or a curved surface and brought into contact with the base unit 11. A leveling driven gear 16 is attached and engaged with an upper end of the adjusting screw 14. The lower casing 13 is supported on the base unit 11 at three points by the pin 12 and by the two adjusting screws 14 so that the lower casing 13 can be tilted in an arbitrary direction around a tip of the pin 12.

A spring 19 is provided between the base unit 11 and the lower casing 13, and the base unit 11 and the lower casing 13 are not separated from each other by a tensile force of the spring 19.

Two leveling motors 17 are provided inside the lower casing 13, a leveling driving gear 18 is attached and engaged with an output shaft of the leveling motor 17, and the leveling driving bear 18 is engaged with the leveling driven gear 16. Each of the leveling motors 17 is independently driven by the control unit 9, and each of the adjusting screws 14 is rotated by driving of the leveling motor 17 via the leveling driving gear 18 and the leveling driven gear 16 so that a downward projecting amount of the adjusting screw 14 is adjusted. Moreover, a tilt sensor 56 which detects tilting in two horizontal directions (See FIG. 3) is provided inside the lower casing 13. The control unit 9 drives the two leveling motors 17 based on a detection signal of the tilt sensor 56. Thereby the leveling of the leveling unit 2 is performed.

Description will be given on the rotary mechanism 3.

The lower casing 13 also serves as a casing of the rotary mechanism 3. A horizontal rotating motor 20 is provided inside of the lower casing 13, and a horizontal rotary driving gear 21 is attached and engaged with an output shaft of the horizontal rotating motor 20.

A rotary base 23 is freely rotatably mounted on an upper end of the lower casing 13 via a ring-shaped bearing 22, a hollow rotation axis 24 projecting downward is provided at a center of the rotary base 23, a horizontal rotary gear 25 is mounted on the rotation axis 24, and the horizontal rotary driving gear 21 is engaged with the horizontal rotary gear 25. The rotary base 23 is rotated by driving of the horizontal rotating motor 20 via the horizontal rotary driving gear 21 and the horizontal rotary gear 25.

Moreover, a horizontal angle detector 26, e.g. an encoder, is provided on the rotation axis 24, a relative rotation angle of the rotation axis 24 with respect to the lower casing 13, that is, a relative rotation angle of the rotary base 23 is detected by the horizontal angle detector 26. A detection result (horizontal angle) is inputted to the control unit 9, and the driving of the horizontal rotating motor 20 is controlled by the control unit 9 based on the detection result.

Description will be given on the measuring system main unit 4.

A main unit casing 27 is fixedly attached on the rotary base 23, and a body tube 28 is mounted inside the main unit casing 27. The body tube 28 has a center line, which is coaxial with a rotation center of the main unit casing 27, and the body tube 28 is mounted by means as required on the main unit casing 27. For example, a flange 29 is formed on an upper end of the body tube 28, and the flange 29 is fixedly attached on a ceiling portion of the main unit casing 27.

The body tube 28 has an optical axis 30 which concurs with the center line, and an aperture mirror 31, which is optical separating means, is provided on the optical axis 30. By the aperture mirror 31, a reflection optical axis 32 is separated from the optical axis 30.

A wavelength selection reflection mirror (dichroic mirror) 33 is provided on the reflection optical axis 32, the reflection optical axis 32 is further divided into a sub reflection optical axis and a sub transmission optical axis by the dichroic mirror 33, and a condenser lens 34 and a photodetection unit 35 are provided on the sub reflection optical axis. A photodetection element such as a photodiode or the like is used for the photodetection unit 35. The dichroic mirror 33 transmits a visible light and reflects an invisible light such as infrared light etc. Therefore, the visible light transmits through the dichroic mirror 33 and is received by an image pickup element 36, while the invisible light is reflected by the dichroic mirror 33 and is received by the photodetection unit 35.

Moreover, the image pickup element 36 is provided on the sub transmission optical axis. The image pickup element 36 outputs a digital image signal and is composed of an assembly of pixels such as a CCD or COMS sensor or the like, for example. Each pixel is configured such that a position (coordinate) in the image pickup element 36 can be specified.

A light source 37, an objective lens 38, and an elevation rotary mirror 39 are provided on the optical axis 30. A light emitting element such as a laser diode or the like is used for the light source 37.

The objective lens 38, the elevation rotary mirror 39 or the like make up together the projection optical system 7, while the elevation rotary mirror 39, the objective lens 38, the aperture mirror 31, the dichroic mirror 33, the condenser lens 34 or the like make up together the photodetection optical system 8.

The light source 37 is a semiconductor laser or the like, for example, emits a pulsed laser beam of an invisible infrared light as a distance measuring light 40 and the light source 37 is controlled by the control unit 9 so that the pulsed laser beam is emitted under a condition as required, e.g. with light intensity as required and at a pulse interval as required or the like. The pulsed laser beam passes through the aperture mirror 31, is reflected by the elevation rotary mirror 39, and is projected to the object to be measured.

The elevation rotary mirror 39 is a deflecting optical member and the elevation rotary mirror 39 deflects the optical axis 30, which runs in a vertical direction, to a projection optical axis 41, which runs in a horizontal direction, and further deflects a beam, which enters along the projection optical axis 41, to the optical axis 30.

In the photodetection unit 35, a reflected distance measuring light from the object to be measured enters the elevation rotary mirror 39 and is deflected onto the optical axis 30 by the elevation rotary mirror 39. Further, the reflected distance measuring light is reflected by the aperture mirror 31 and the dichroic mirror 33, and the reflected distance measuring light enters the photodetection unit 35 and is detected by the photodetection unit 35. It is so designed that a part of luminous fluxes separated from the distance measuring light 40 enters the photodetection unit 35 as an internal reference light (not shown), and a distance to the object to be measured is measured based on the reflected distance measuring light and the internal reference light.

The reflection optical axis 32, the dichroic mirror 33, the condenser lens 34, the photodetection unit 35, the elevation rotary mirror 39 or the like make up together the distance measuring unit 6.

An image pickup light from the object to be measured is entered to the elevation rotary mirror 39 along an image pickup optical axis 42 coincident the projection optical axis 41. After the image pickup light is reflected by the elevation rotary mirror 39, the image pickup light is transmitted through the objective lens 38 and is reflected by the aperture mirror 31, and the image pickup light transmits through the dichroic mirror 33 and is received by the image pickup element 36, and an image is acquired. Therefore, a distance measuring optical axis for measuring a distance is coaxial with the image pickup optical axis for acquiring the image in the direction of the object to be measured. The elevation rotary mirror 39, the objective lens 38, the dichroic mirror 33, the image pickup element 36 or the like make up together the image pickup unit 10 (See FIG. 3).

Description will be given on the scanning unit 5.

An upper casing 43 is provided on the upper side of the main unit casing 27. A side wall of the upper casing 43, or preferably the total circumference of the side wall and the ceiling are constituted of a transmissive member, is designed as a light projection window 44 through which the distance measuring light 40 is transmitted. The scanning unit 5 is accommodated inside the upper casing 43. Further, description will be given below on the scanning unit 5.

A mirror holder 45 is mounted on an upper end of the flange 29, a horizontal rotation shaft 46 is freely rotatably provided on the mirror holder 45, and the elevation rotary mirror 39 is fixed to the rotation shaft 46. The elevation rotary mirror 39 is freely rotatably provided on the mirror holder 45 via the rotation shaft 46. An elevation rotary gear 51 is attached and engaged with one of shaft ends of the rotation shaft 46, and an elevation angle detector 52 is provided on the other shaft end of the rotation shaft 46. The elevation angle detector 52 is configured to detect a rotation angle (rotation position) of the elevation rotary mirror 39 and to send out a detection result to the control unit 9.

An elevation rotating motor 53 is mounted on the mirror holder 45, an elevation rotary driving gear 54 is attached and engaged with an output shaft of the elevation rotating motor 53, and the elevation rotary driving gear 54 is engaged with the elevation rotary gear 51. The elevation rotary mirror 39 is rotated by driving of the elevation rotating motor 53 via the elevation rotary driving gear 54 and the elevation rotary gear 51.

The driving of the elevation rotating motor 53 is controlled by the control unit 9 based on the detection result by the elevation angle detector 52. Moreover, the control unit 9 can control driving operation of the horizontal rotating motor 20 and the elevation rotating motor 53 so that the horizontal rotating motor 20 and the elevation rotating motor 53 are driven independently or synchronizingly.

A sight 47 is provided on an upper surface of the upper casing 43. A sighting direction of the sight 47 runs perpendicularly to the optical axis 30 and also runs perpendicularly to the rotation shaft 46.

Figure 3:
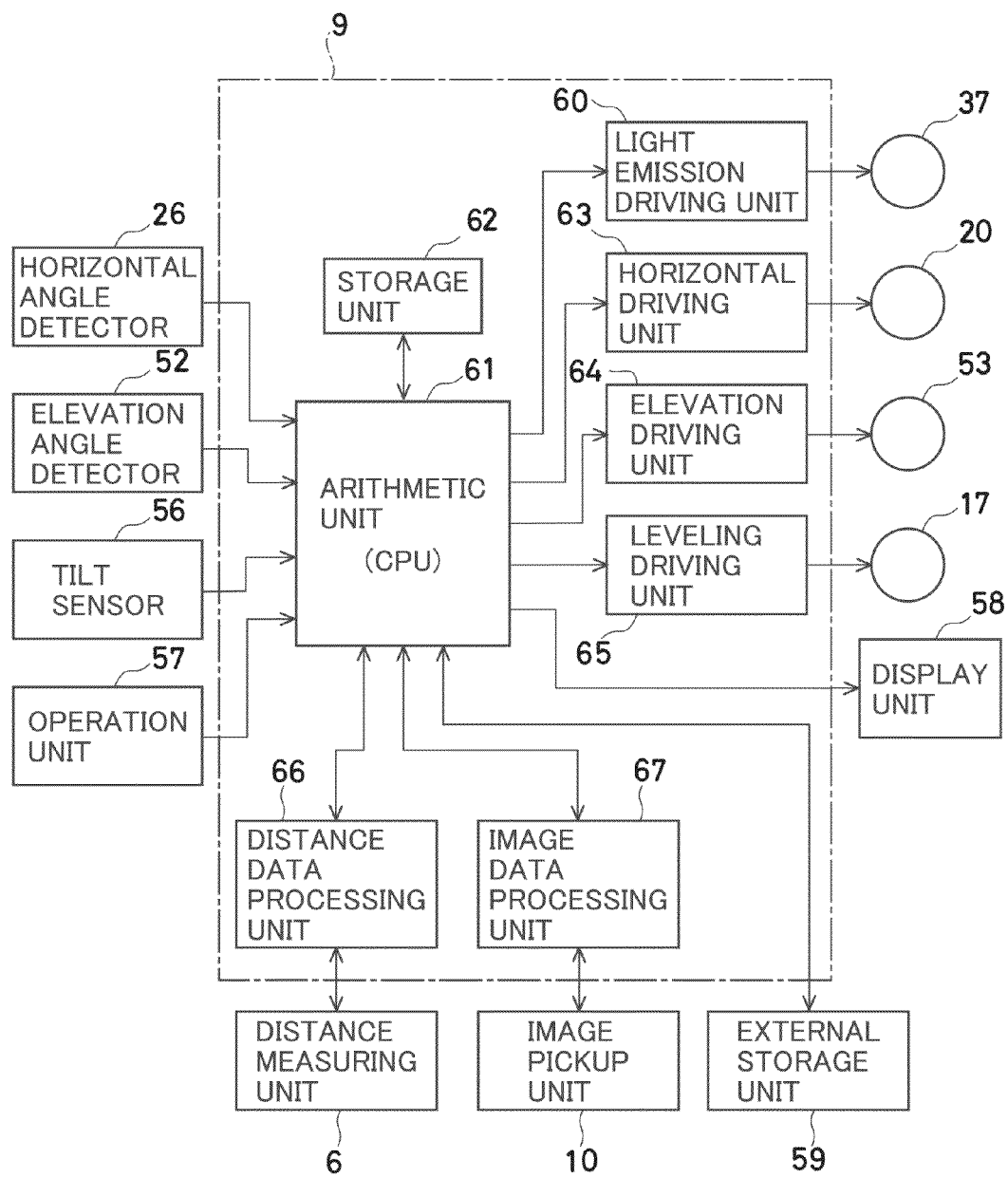
FIG. 3 is a block diagram to show an arrangement of the laser scanner.

Referring to FIG. 3, description will be given on a control system of the laser scanner 1.

To the control unit 9, the horizontal angle detector 26, the elevation angle detector 52, the tilt sensor 56, and an operation unit 57 are connected. To the control unit 9, detection signals from the horizontal angle detector 26, the elevation angle detector 52 and the tilt sensor 56 are inputted and a signal from the operation unit 57 is also inputted by operation of an operator.

The operator performs the setting of conditions necessary for starting the measurement of the laser scanner 1 from the operation unit 57, for instance, a setting of a measurement range, a setting of a density of point-group data, a setting of a scan speed or a setting of an image pickup condition during the photographing or the like and also, the operator can input an instruction to start the measurement or the like from the operation unit 57. The operation unit 57 may be installed in a casing such as the main unit casing 27 or the like or may be independently provided separately and may be capable of remote control via a signal transmitting medium such as wireless, infrared light, or the like.

The control unit 9 drives the light source 37, the horizontal rotating motor 20; the elevation rotating motor 53, and the leveling motor 17 and also drives a display unit 58 which displays operating conditions, measurement results or the like. Moreover, an external storage unit 59 such as a memory card, an HDD or the like is provided in the control unit 9. The external storage unit 59 may be provided fixedly or may be provided removably on the control unit 9.

Description will be given on general features outline of the control unit 9.

The control unit 9 comprises an arithmetic unit 61 represented by a CPU and a storage unit 62 which stores programs and data such as measurement data and image data, etc. These programs include a sequence program and an arithmetic program which are necessary for measuring a distance, detecting an elevation angle, and detecting a horizontal angle, a measurement data processing program for executing the processing of the measurement data, an image pickup program for controlling an image pickup state of the image pickup unit 10, an image processing program for image processing, an image display program for displaying the data on the display unit 58 or the like, and a program for integrally managing these programs or the like. The control unit 9 comprises a light emission driving unit 60 for controlling the light emission of the light source 37, a horizontal driving unit 63 for driving and controlling the horizontal rotating motor 20, an elevation driving unit 64 for driving and controlling the elevation rotating motor 53, a leveling driving unit 65 for driving and controlling the leveling motor 17, a distance data processing unit 66 for processing distance data acquired by the distance measuring unit 6, an image data processing unit 67 for processing the image data acquired by the image pickup unit 10 or the like.

The functions of the distance data processing unit 66 and the image data processing unit 67 may be executed by the arithmetic unit 61, and in this case, the distance data processing unit 66 and the image data processing unit 67 can be omitted. By individually providing the distance data processing unit 66 and the image data processing unit 67, the distance data processing and the image data processing can be executed in parallel, and the high-speed processing can be performed.

The distance data processing unit 66 and the image data processing unit 67 may be provided separately. For example, it may be so designed that a PC is provided separately so that the PC carries out the functions of the distance data processing unit 66 and the image data processing unit 67. In this case, it may be so designed that communication means is provided in the laser scanner 1 and the PC so that the distance data and the image data are sent to the PC, and the PC executes the distance data processing and the image data processing. As the communication means, communication means as required such as optical communication, wireless communication, LAN or the like can be employed.

Next, description will be given on a measuring operation by the laser scanner 1.

The laser scanner 1 is installed at a known point, the leveling is instructed from the operation unit 57, and the leveling is carried out.

The leveling motor 17 is driven via the leveling driving unit 65, a tilting of the laser scanner 1 is detected by the tilt sensor 56, and a detection result by the tilt sensor 56 is fed back to the control unit 9. The adjusting screw 14 is rotated by the leveling motor 17 so that the tilt sensor 56 detects a horizontal position.

When the leveling is completed, the completion of leveling is displayed on the display unit 58 or the completion of leveling is announced by means such as an alarm sound or the like.

When the leveling is finished, the laser scanner 1 is directed to a measuring direction, sighting of the measuring direction is performed by the sight 47, and further, the measurement area is set. In a case where the measurement area is wider than a field angle that can be photographed at once by the image pickup unit 10, the measurement area is equally divided as required in the perpendicular direction and the horizontal direction. Moreover, one section obtained by the division is set so that the section is smaller than the field angle of the image pickup unit 10 and adjacent sections overlap each other vertically and horizontally only by a predetermined width.

When the setting of the measurement range is completed, the projection optical axis 41 is oriented toward a scanning start point (In a case where the measurement area has a rectangular shape, one of the four corners), and the distance measurement is started.

The pulsed distance measuring light 40 is emitted from the light source 37, the pulsed distance measuring light 40 passes through a hole of the aperture mirror 31 and is turned to parallel luminous fluxes by the objective lens 38. Further, the distance measuring light 40 is deflected by the elevation rotary mirror 39 to the horizontal direction and is projected on the projection optical axis 41.

Under a condition that the distance measuring light 40 is emitted as a pulsed light, the horizontal rotating motor 20 and the elevation rotating motor 53 are driven in synchronization, the elevation rotary mirror 39 is rotated in the elevation direction, and the measuring system main unit 4 is rotated in the horizontal direction. For example, each time the distance measuring light 40 is projected in the elevation direction for scanning, the measuring system main unit 4 is horizontally rotated at an angle pitch as required. Since the feeding is applied in the horizontal direction of the distance measuring light 40, a total region of the measurement area is scanned (laser scanning) by the distance measuring light 40 which is emitted as pulsed light (hereinafter referred as the pulsed distance measuring light 40). The horizontal rotation may be continuous rotation considering time for reciprocating in the elevation direction.

The reflected distance measuring light reflected by the object to be measured enters the elevation rotary mirror 39, is deflected to the optical axis 30 by the elevation rotary mirror 39, is reflected by the aperture mirror 31, and is directed toward the dichroic mirror 33. As for the reflected distance measuring light which enters the dichroic mirror 33, only the reflected distance measuring light, which is the infrared light, is reflected due to a wavelength selection action of the dichroic mirror 33, is converged by the condenser lens 34, and is received by the photodetection unit 35. In the distance measuring unit 6, the distance measurement is performed for, each pulse based on the reflected distance measuring light.

At the same time as the distance data is acquired, a detected horizontal angle of the horizontal angle detector 26 and a detected elevation angle of the elevation angle detector 52 at the pulsed light emission are also acquired. Each distance data is associated with the elevation angle data, the horizontal angle data, and the time and is stored in the storage unit 62.

Here, the number of the distance data to be acquired can reach several million to several tens of million, though the number depends on a size of the measurement area. By associating the acquired distance data with the elevation angle data and the horizontal angle data, the three-dimensional point data about each measuring point can be acquired, and the three-dimensional point group data of the total region of measurement area can be acquired.

Figure 4A:
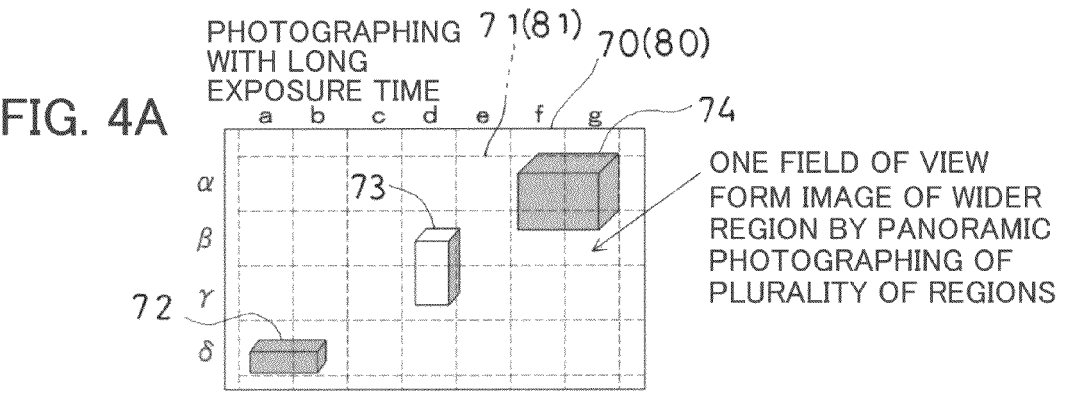
FIG. 4A, FIG. 4B, and FIG. 4C illustrate a measurement area and sections obtained by dividing the measurement area and a relationship between a panoramic image and a partial image and are explanatory drawings in a case where partial images photographed with varied contrast are incorporated in the panoramic image.
Figure 4B:
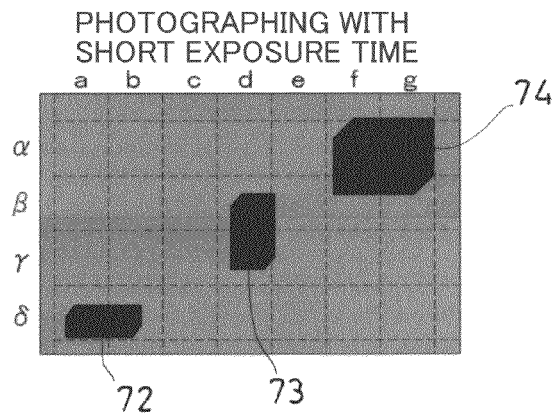
Figure 4C:
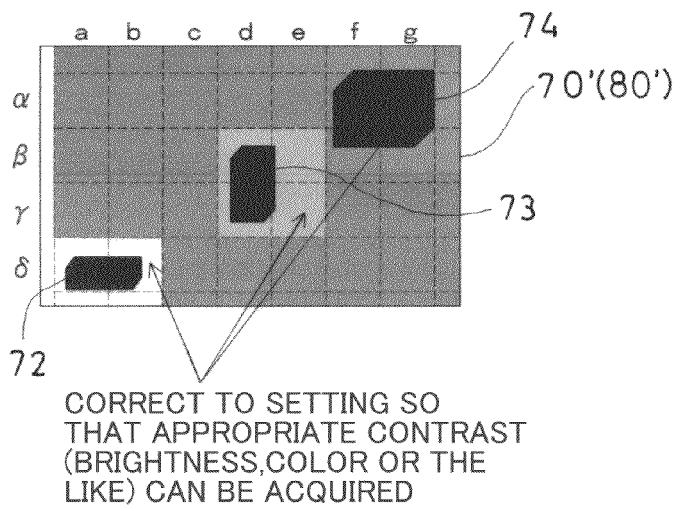

Next, description will be given on the photographing of the measurement area by referring to FIG. 4A, FIG. 4B, and FIG. 4C. In FIG. 4A, FIG. 4B, and FIG. 4C, reference numeral 70 denotes a measurement range which is set, and reference numeral 71 denotes one section. Moreover, the measurement range 70 includes objects to be measured 72, 73, and 74. In the figure, reference characters a to g denote addresses in the horizontal direction of the section 71 and reference characters α to δ denote addresses in the vertical direction (elevation direction) of the section 71.

In cases where a photo is taken by the image pickup unit 10, first, at least two image pickup conditions are set. As the image pickup conditions to be set, there are settings of exposure time, aperture, light sensitivity, white balance or the like, but in the following description, the contrast in plural stages are set considering brightness and tone of the image to be acquired. For example, three stages are set. As the specific contrast, values with which an image photographed of the darkest place or the darkest object and of the brightest place or the brightest object in the measurement range 70 have the appropriate contrast are obtained in advance preliminarily respectively, and the plural contrasts may be set based on these values. Alternatively, the contrast in two stages or three stages may be set empirically.

The sections 71 in the measurement range 70 are photographed by the image pickup unit 10 in a predetermined order, and each of the sections 71 is photographed in the set three-stage contrast, and partial images 81 of each section 71 are acquired. Therefore, the whole range of the measurement range 70 is photographed in the contrast in plural stages respectively.

Moreover, since the horizontal angle and the elevation angle of a center position of the section 71 are detected by the horizontal angle detector 26 and the elevation angle detector 52, the images (the partial images 81) of all the sections 71 are synthesized based on the horizontal angle and the elevation angle of each partial image 81 and by matching overlapped portions of the partial images 81 so as to synthesize a panoramic image 80 of a total region of measurement range 70. Therefore, three panoramic images with different contrasts can be acquired. The image photographed with the predetermined contrast out of the plural panoramic images is set as a reference panoramic image.

FIG. 4A shows a case of the photographing by making the exposure time longer, in which the object to be measured 72 in, the dark part has the appropriate contrast, while the contrast of the object to be measured 73 having the intermediate brightness is somewhat bright, and the contrast of the object to be measured 74 in the bright part is too bright and it is difficult to recognize the object to be measured.

FIG. 4B shows a case of the photographing by making the exposure time shorter, in which the contrast of the object to be measured 72 in the dark part is too dark and it is difficult to recognize the object to be measured, while the contrast of the object to be measured 73 having the intermediate brightness is somewhat dark, and the object to be measured 74 in the bright part has the appropriate contrast. The panoramic image photographed with the intermediate contrast is not shown.

FIG. 4C shows a state in which a panoramic image 80' is synthesized by the images with the optimal contrast about each object to be measured.

In description with respect to FIG. 4C, the panoramic image synthesized by the images with the smallest (darkest) contrast is used as the reference panoramic image. In this case, the object to be measured 74 has the optimal contrast, while the contrast of the object to be measured 73 is somewhat dark, and as for the object to be measured 72, it is difficult to recognize the object to be measured 72.

Next, for the sections 71 (dβ, dγ, eβ, eγ) including the object to be measured 73, the images photographed with the intermediate brightness are selected and for the sections 71 (aδ, bδ) including the object to be measured 72, the images photographed with the highest brightness in the three stages are selected. FIG. 4C shows the panoramic image 80', which is synthesized by using the images photographed with the optimal contrast respectively, as for the object to be measured 73 and the object to be measured 72. Therefore, in the panoramic image 80' illustrated in FIG. 4C, each of the image data of portions including the objects to be measured 72, 73, and 74 have the optimal contrast, that is, the image data have an optimal image quality.

Usually, the gradation of a digital image is 12 bits but the gradation range is increased in a pseudo manner by synthesizing the images photographed with different contrasts.

Figure 5:
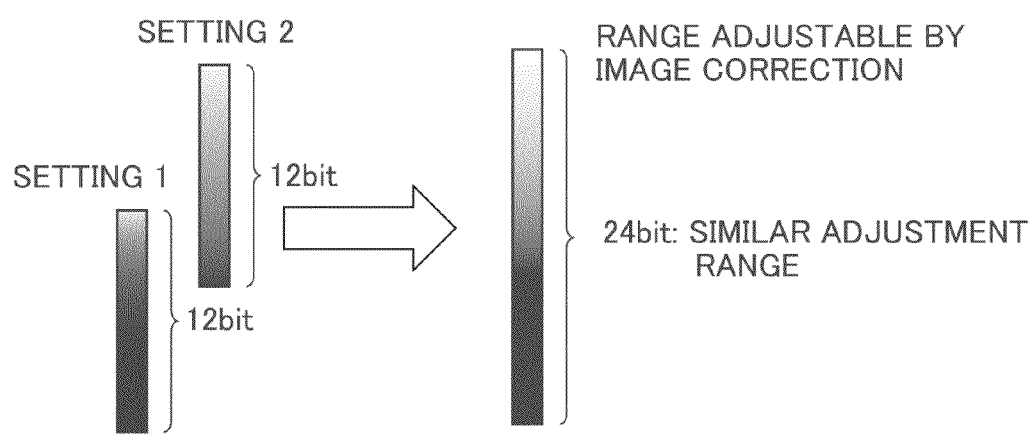
FIG. 5 is an explanatory drawing to show an increase in adjustable contrast range in a case where the contrast is changed in the panoramic image.

FIG. 5 is a schematic diagram for explaining an increase in the gradation in a case where the images with different contrasts are combined and FIG. 5 illustrates that the gradation becomes 24 bits in a pseudo manner by synthesizing the images having 12 bits and different contrast settings in two stages.

The positions in the panoramic image of the pixels which are included in the whole range of the panoramic image 80 (the positions in the measurement range) can be specified from the horizontal angle and the elevation angle and the position (coordinate) in each field angle of each section 71. Therefore, a three-dimensional coordinate of the point measured by the pulsed light emission can be corresponded to a pixel in the panoramic image, and a color data of the pixel can be attached to the three-dimensional coordinate data.

Thus, a colored image by colored point-group data can be prepared and the whole panoramic image or each object to be measured can have the optimal contrast.

In a case where only small adjustment is needed as a whole, the contrast of the total region of measurement range 70 can be adjusted together after the setting of the reference panoramic image.

Figure 6:
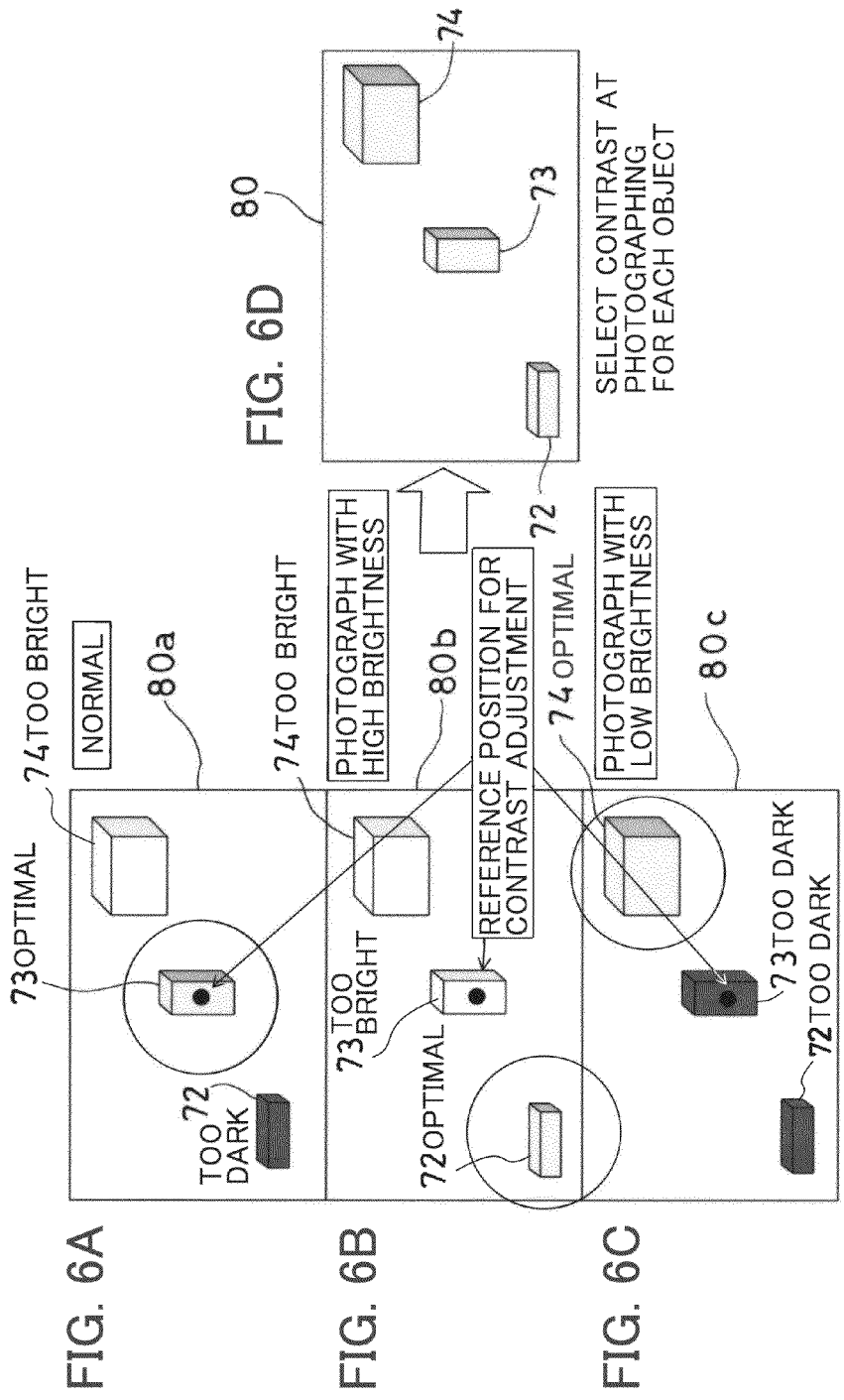
FIG. 6A, FIG. 6B, and FIG. 6C are plural panoramic images with different contrasts.
FIG. 6D is an explanatory drawing in a case where a panoramic image is to be prepared again by extracting the partial image with the optimal contrast.

FIG. 6 illustrates a second embodiment in which the contrasts of the objects to be measured 72, 73, and 74 are optimal.

In FIG. 6A, FIG. 6B, and FIG. 6C, partial images are acquired with different contrasts, respectively, and FIG. 6D illustrates a panoramic image synthesized for each contrast.

FIG. 6A illustrates a panoramic image 80a (normal image) which is photographed by setting the contrast using a center of the image as a reference and is synthesized, and the object to be measured 73 located at the center has an optimal reference contrast.

FIG. 6B illustrates a panoramic image 80b acquired by synthesizing partial images which are photographed by making exposure time longer so as to increase brightness. Under this image pickup condition, the object to be measured 72 photographed with lower brightness has the optimal contrast, but the object to be measured 73 and the object to be measured 74 have overexposure, that is, the image is too bright and sufficient contrast cannot be acquired.

FIG. 6C illustrates a panoramic image 80c acquired by synthesizing partial images which are photographed by making the exposure time shorter so as to decrease brightness. Under this image pickup condition, the object to be measured 74 photographed with higher brightness has the optimal contrast, but the object to be measured 72 and the object to be measured 73 have underexposure, that is, the image is too dark and the sufficient contrast cannot be obtained.

The panoramic images 80a, 80b, and 80c are stored in the external storage unit 59. The operator makes the display unit 58 display the panoramic images 80a, 80b, and 80c. The display of the panoramic images 80a, 80b, and 80c may be selectively displayed on the display unit 58, or a display screen is divided and the panoramic images 80a, 80b, and 80c may be displayed on the divided screen at the same time.

The operator selects the panoramic image, in which the object to be measured has the optimal contrast, for each object to be measured based on the displayed images and instructs the object to be measured in the image. When the object to be measured is instructed, the arithmetic unit 61 specifies the object to be measured from an acquired three-dimensional coordinate, further, sets a cut-out region of the image, cuts out the region and attaches the region to the reference panoramic image. The reference panoramic image to be attached may be the normal image 80a or may be a newly prepared image.

For example, in the normal image, the object to be measured 73 is selected, the region including the object to be measured 73 is cut out, the region is attached to the panoramic image 80 illustrated in FIG. 6D. In the panoramic image 80b photographed with higher brightness, the object to be measured 72 is selected, the region including the object to be measured 72 is cut out, and further, in the panoramic image 80c photographed with lower brightness, the object to be measured 74 is selected, the region including the object to be measured 74 is similarly cut out, the regions are attached to the panoramic image 80, respectively, and the panoramic image 80 having the appropriate contrast is re-synthesized. The region to be cut out may be set by the operator from the image.

By attaching the color data to each measuring point based on the acquired panoramic image 80 and the point-group data, the colored image, which has the optimal contrast about each object to be measured, can be acquired.

Figure 7:
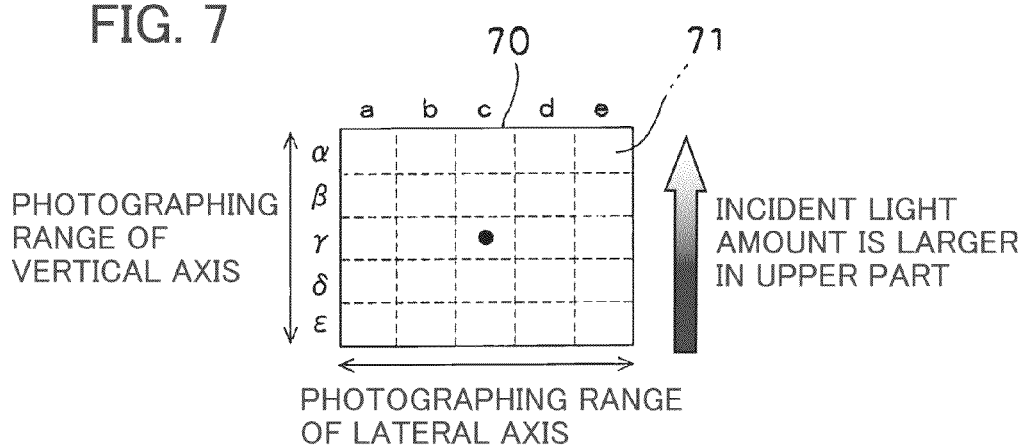
FIG. 7 is an explanatory drawing to show photographing by setting the contrast in advance for each section in a case where brightness is different depending on a photographing direction in a measurement range.
Figure 8:
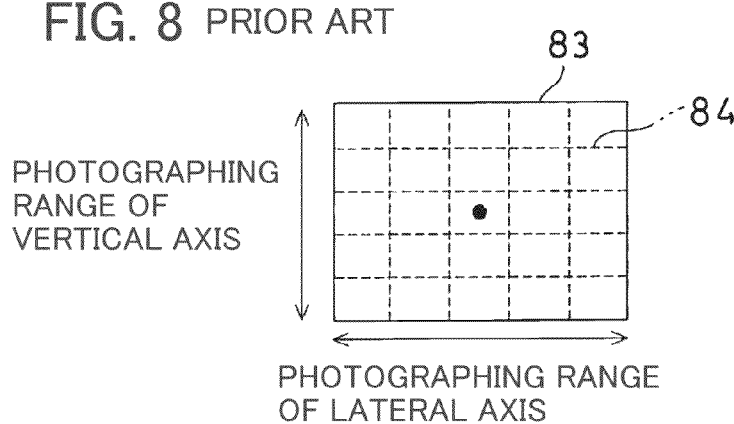
FIG. 8 is an explanatory drawing to show a conventional relationship between a measurement area and sections obtained by dividing the measurement area and a method of setting the contrast of the panoramic image.
Figure 9:
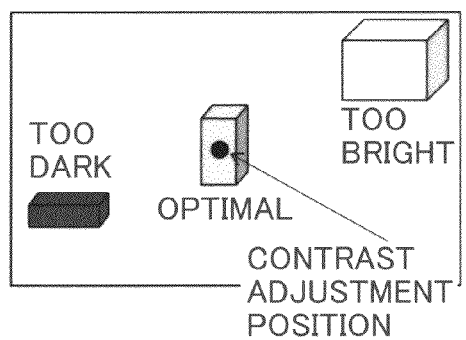
FIG. 9 is an explanatory drawing in a case where the sections are photographed by a conventional method and the panoramic image is synthesized by photographed partial images.

FIG. 7 illustrates a third embodiment in which the contrast is set so that the whole panoramic image has the optimal contrast in a case where the panoramic image is to be acquired.

In the photographing to acquire the panoramic image, a direction of the image pickup device is sequentially changed, and there are a direction where an object is photographed bright and a direction where an object is photographed dark. For example, under the strong sunlight, in a direction facing the sun, which is a direction of backlight, the object is photographed dark, while in a direction with the back against the sun, the object is photographed bright or the like.

In this case, since it is known in advance that the brightness is different depending on a photographing direction, a measurement range 70 is set, and when the measurement range 70 is divided into sections 71, the contrast (brightness) is set for each section 71. For example, in a case where the brightness gets stronger from the lower side to the upper side in the measurement range 70 in FIG. 7 (the incident light amount is larger in photographing), the setting is made such that the contrast in the photographing gets brighter toward the lower side in the measurement range 70.

In the third embodiment, since the optimal contrast is set each time when the section 71 is photographed, the number of photographing for each section 71 can be one. Therefore, in the third embodiment, capacity of memory required for storing the image data can be made small.

In the above embodiments, an image pickup unit 10 is provided on the same optical axis as a photodetection optical system 8, but the image pickup unit 10 may be provided separately from the photodetection optical system 8, and the photodetection optical system 8 and the image pickup unit 10 may have a known relationship.

The invention claimed is:

1. A panoramic image preparing method comprising a step of setting a measurement range from a known point so as to include objects to be measured, a step of dividing said measurement range as required and setting two or more sections, a step of synthesizing partial images photographed by one image pickup unit from said known point for each of said sections and preparing a panoramic image, a step of photographing each of said sections respectively under two or more contrasts and a step of synthesizing said panoramic image by using a partial image with optimal contrast out of said partial images photographed under two or more contrasts at least about said object to be measured.

2. The panoramic image preparing method according to claim 1, wherein at least about said section including said object to be measured, said panoramic image is synthesized by using an image photographed under the optimal image pickup condition out of the acquired images.

3. The panoramic image preparing method according to claim 1, further comprising a step of preparing a panoramic image by partial images acquired under the same image pickup condition, a step of selecting said panoramic image having the optimal image pickup condition about said object to be measured out of the two or more panoramic images with the two or more image pickup conditions, a step of cutting a region including said object to be measured out of the selected panoramic image, and a step of synthesizing said panoramic image by using the cut-out image.

4. The panoramic image preparing method according to one of claims 1 to 3, wherein said image pickup condition is set for each of said sections in accordance with a photographing direction in a case where a light amount is different depending on the photographing direction.

5. A three-dimensional laser scanner, which is installed at a reference point, scans with a pulse laser beam, measures a distance for each pulse laser beam and acquires point-group data, comprising a light source for emitting a distance measuring light of a pulsed laser beam, a projection optical system for projecting said distance measuring light from said light source to a measurement range, a photodetection unit for receiving a reflected distance measuring light, a scanning unit for scanning said measurement range with said distance measuring light, an angle detection unit for detecting a projecting direction of said distance measuring light, a distance measuring unit for calculating for each pulse laser beam a distance to an object to be measured located in said measurement range based on photodetection signals from said photodetection unit, one image pickup unit for acquiring an image of said measurement range, and a control unit for controlling said light source, said photodetection unit, said scanning unit, said distance measuring unit, and said image pickup unit, wherein said control unit calculates three-dimensional data for each of the distance measurement results based on an angle detection signal from said angle detection unit and based on a distance measurement result from said distance measuring unit, further acquires three-dimensional point-group data, sets said measurement range so as to include from said reference point to said object to be measured, divides said measurement range into at least two or more sections, photographs each section from said reference point using said image pickup unit in a plurality of contrasts, respectively, and acquires a partial image, synthesizes said partial images and prepares a panoramic image of said measurement range, and at least about said partial image of said section including said object to be measured out of said partial images to be synthesized is photographed under the optimal contrast.

6. The three-dimensional laser scanner according to claim 5, wherein said control unit acquires said partial image by photographing each of said section under at least two image pickup conditions, synthesizes said partial images photographed under one image pickup condition and prepares a reference panoramic image, selects an image with the optimal image pickup condition out of at least two image pickup conditions about the image of said object to be measured and attaches the image to said reference panoramic image.

7. The three-dimensional laser scanner according to claim 6, wherein said control unit sets a cut-out region of the image based on said three-dimensional data, selects the image having said cut-out region with the optimal image pickup condition out of the images photographed under at least two image pickup conditions, cuts out said cut-out region from the image and attaches said cut-out region to said reference panoramic image.

8. The three-dimensional laser scanner according to claim 6, wherein said partial image in which said object to be measured has the optimal image pickup condition is selected and the image is attached to said reference panoramic image.

* * * * *